United States Patent [19]

Körber et al.

[11] Patent Number: 4,953,645
[45] Date of Patent: Sep. 4, 1990

[54] ELECTRIC WHEEL-CHAIR

[75] Inventors: Hans W. Körber; Reinhard Köster, both of Kiel; Ewald Linse, Heikendorf; Dieter Simmat, Kiel, all of Fed. Rep. of Germany

[73] Assignee: Ortopedia GmbH, Kiel, Fed. Rep. of Germany

[21] Appl. No.: 286,530

[22] Filed: Dec. 19, 1988

[30] Foreign Application Priority Data

Jan. 12, 1988 [DE] Fed. Rep. of Germany ....... 3800649
Sep. 21, 1988 [DE] Fed. Rep. of Germany ....... 3832125

[51] Int. Cl.$^5$ .............................................. A61G 5/04
[52] U.S. Cl. ................................... 180/6.5; 180/65.1; 180/79.1; 180/907; 280/304.1
[58] Field of Search ............... 180/967, 329, 330, 6.58, 180/6.6, 65.1, 6.62, 6.28, 6.32, 6.5, 233, 234.6.4, 79.1, 6.24; 280/304.1, 250.1

[56] References Cited

U.S. PATENT DOCUMENTS 4,341,278  7/1982  Meyer ................................. 180/907

FOREIGN PATENT DOCUMENTS 665928   2/1952   Fed. Rep. of Germany ...... 180/907
3724161  12/1988  Fed. Rep. of Germany ...... 180/907

*Primary Examiner*—David M. Mitchell
*Attorney, Agent, or Firm*—John P. White

[57] ABSTRACT

The electric wheel-chair comprises drive wheels on one axle group, and swivel wheels on a second axle group, with the swivel wheels being either freely pivotable or positively steerable by an engageable steering drive. The positive steering system may have either a purely electric configuration in the form of a pair of electric steering drives, or an electro-mechanical configuration in the form of a common steering drive and a mechanical steering mechanism with electro-mechanical disengagement of the positive steering system. Switch-over from pivoting to steering operation is monitored by position sensors provided on the swivel wheels. As the seat assembly is adapted to be rotated to a corresponding position, the swivel wheels may be operated alternatively as the front wheels or the rear wheels of the wheel-chair. Owing to the engageable steering drive, the wheel-chair is well adapted for both indoor operation and outdoor operation, thereby considerably enhancing the mobility of a disabled person.

17 Claims, 4 Drawing Sheets

ELECTRIC WHEEL-CHAIR

The present invention relates to an electric wheel-chair comprising a chassis which has large drive wheels mounted on a first axle group and smaller swivel wheels mounted on a second axle group, and which further includes a seat assembly, a drive unit for the drive wheels, and an operating unit for controlling the drive unit. In electric wheel-chairs of this type, the larger drive wheels are normally use not only for propulsion, but also for steering purposes, because the (turning) direction is determined by the difference in speed of rotation of the drive wheels.

Generally, wheel-chairs serve to improve the mobility of people who lost their capability to walk or other body functions. Depending on the degree of handicap, different systems and constructions of wheel-chairs are employed. In the case of a severe reduction in one or more body functions, the use of a power-operated wheel chair, normally of an electric wheel-chair, becomes necessary in general. In order to provide for as high as possible a mobility of a disabled person when using an electric wheel-chair, the latter must satify requirements which may be inconsistent with each other depending on the kind of use and place of use.

For use of an electric wheel-chair within closed rooms —this constituting normally the major part of use—maximum manoeuvrability of the wheel-chair in combination with easy handling and minimum weight thereof is desirable. When the same wheel-chair is used outside of closed rooms under different conditions, for greater distances, etc., other requirements are imposed on this wheel-chair, e.g. with respect to good reaction, good directional stability, capability of easily travelling across obstacles, good shock absorption, etc.

In the past, these different requirements also resulted in different (constructional) concepts of wheel-chairs, which may be roughly classified into two categories:

(1) Electric wheel-chairs for indoor use:

In general, these are wheel-chairs having small swivel casters or swivel wheels in the front and large drive wheels at the rear end, with the swivel wheels normally not having any auxiliary steering means. Change of direction of the electric wheel-chair is obtained solely through the difference in speed of rotation of the pair of drive wheels.

(2) Electric wheel-chairs for outdoor use:

In general, these are electric wheel-chairs having large drive wheels in the front to permit easy travel across obstacles, and swivel wheels or steerable wheels in the rear portion, with these steerable wheels frequently being provided with a positive steering system. Here, the positive steering action and the difference in speeds of rotation of the drive wheels are usually coordinated with each other.

These conventional wheel-chairs designed for one specific field of use each, are useful for the other field of use to a limited degree only. For example, a wheel-chair designed for outdoor use and provided with positive steering of the swivel wheels through a mechanical steering linkage, is not expedient for indoor use since the positive steering system permits a limited angle of traverse only. On the other hand, wheel-chairs designed for indoor use and having freely pivotable steerable wheels are not very suited for outdoor use, because the pair of pivotable (swivelling) wheels result in a certain instability in the travel direction. For these reasons, a disabled person would always need two wheel-chairs, this being not possible in most instances for financial reasons and reasons of storing space.

It is the object of the invention to provide an electric wheel-chair which is designed so that it may be used with advantages for both indoor use and outdoor use, and which equally satisfies the various above-mentioned requirements.

In an electric wheel-chair of the type as outlined above, according to the invention this object is solved in that the swivel wheels are freely pivotable selectively, and that at least one of said swivel wheels is adapted to be positively steered through engageable steering actuator means.

Owing to the selective engagement of steering actuator means with the swivel wheels as according to the invention, use can be made of the advantages of both the free pivotability and the positive steering, as required. As the swivel wheels are expediently operated as front or rear wheels as required, the seat assembly, too, is expediently designed to be pivotable or rotatable, so that it may be rotated to the respective direction of travel depending on the orientation of the drive wheels and swivel wheels.

Preferably, the selectively engageable positive steering system is coordinated with the difference in speed of rotation of the drive wheels. Further, the arrangement may be made so that the steering drive means is engageable manually or automatically in accordance with the speed (of travel) of the wheel-chair.

Special embodiments and further developments of the invention are disclosed in the subclaims.

Below, the invention is explained in greater detail with reference to exemplary embodiments. These embodiments relate to a combination electric wheel-chair in which the seat assembly may be rotated by 180° as required, depending on whether the drive wheels are to be used as the front or the rear wheels. However, the wheel-chair may be designed differently with respect to the seat assembly and its other structure.

Figure 1:
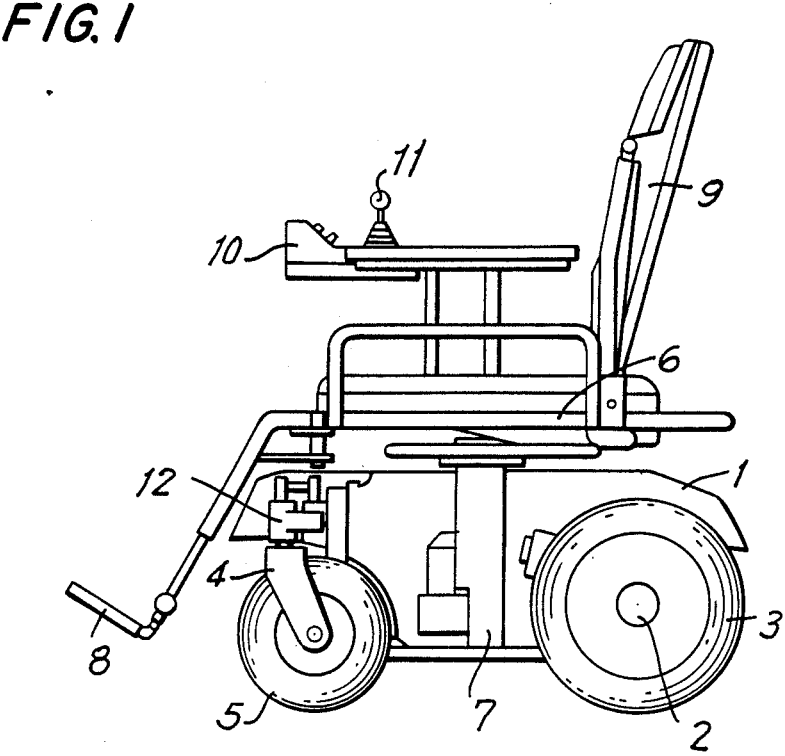
FIG. 1 is a side elevational view of a combination electric wheel-chair.

FIG. 1 shows in side elevational view a combination electric wheel-chair. A chassis 1 comprises large drive wheels 3 mounted on an axle 2, and pivotally mounted swivel wheels 5 suspended from wheel forks 4. A seat assembly (or group) 6 is rotatably mounted on the chassis 1 through a central column 7. In a conventional manner, the seat assembly includes foot rests 8 and a back rest 9 as well as a laterally positioned operating unit 10 provided with a control stick 11. By tilting the control stick 11 from the zero (neutral) position to the front or rear, a signal being proportional to the desired speed of travel is input to the drive system; the electric wheel-chair responds with a corresponding forward or reverse speed. By lateral tilting of the control stick 11 to the left or right, a corresponding desired change of direction is set for the electric wheel-chair.

As mentioned above, in the wheel-chair shown in FIG. 1 the seat assembly 6 is mounted for rotation on the chassis 1. In the position shown, the back rest 9 is positioned above the drive wheels 3, while the foot rests 8 are located above the swivel wheels 5. Thus, the drive wheels are positioned at the rear end relative to the seating direction or direction of travel, respectively. This configuration is particularly favorable for indoor use because of the high manoeuvrability of the electric wheel-chair. When the seat assembly is rotated by 180°, the back rest 9 comes to be located above the swivel wheels 5, and the foot rests 8 assume a position above the drive wheels 3. Then, the drive wheels are at the front end as seen in the direction of travel. This configuration provides special advantages for outdoor use, because larger obstacles are easier to be overcome by the large front wheels. In both configurations (or modes of operation) of the combination electric wheel-chair, or with a fixedly mounted seat assembly for each wheel-chair, it holds that changes of direction are brought about by different speeds of rotation of the drive wheels 3, whereas the swivel wheels 5 follow the direction determined by the drive wheels 3 due to the rolling friction on the ground and the trail or caster angle.

In the electric wheel-chair according to the invention, these swivel wheels 5 are positively steerable or powersteerable by (selectively) connectible or engageable steering actuator 12, such that these swivel wheels become steerable wheels. Various embodiments of this engageable steering drive means can be seen from FIGS. 2 to 5.

Figure 2:
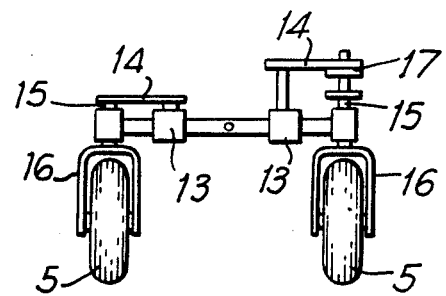
FIG. 2 is a schematical front elevational view of a swivel wheel assembly.

As shown in FIG. 2, each of the pair of swivel wheels 5 may be provided with an associated steering actuator 13; in this structure, a transmission element of any suitable type, e.g. one toothed belt 14 for each wheel, transmits the rotary motion of the steering drive means to shaft 15 of the respective wheel fork 16. In the wheel 5 shown at the right in FIG. 2, it is indicated in what a manner the steering drive means 13, in a special embodiment, is connected to shaft 15 through a—schematically illustrated—clutch or coupling 17. The clutch or coupling 17 is or any conventional deign known in the art, including for example friction clutches or mechanical coupling devices with positive mechanical interlocking engagement between mechanical compenents. When the coupling 17 is disengaged, the swivel wheel 5 is free to pivot. The free pivotability of the rear wheels imparts a high manoeuvrability to the electric wheel-chair; namely, the wheel-chair may turn substantially on the point. Owing to the instability of the vehicle with rear-mounted swivel wheels, however, this configuration must be limited to lower speeds of travel only, and it should therefore be chosen preferably for indoor use only.

In order to obtain safety or stability of the electric wheel-chair within a wide range of travelling speeds, automatic engagement of the power steering system at a given speed of travel is possible.

Figure 3:
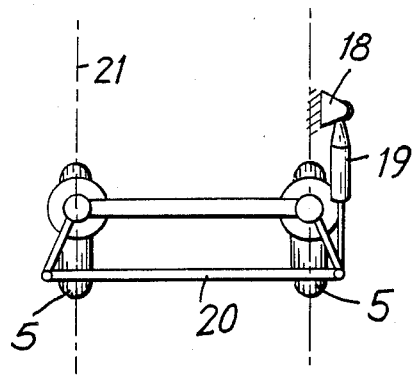
FIG. 3 is a plan view of a modified swivel wheel assembly.

FIG. 3 illustrates the principle of a positive (or power) steering system through one single steering actuator 18 for both swivel wheels. This steering actuator 18 is mounted to the chassis through a schematically illustrated suspension 19, and it acts on both swivel wheels 5 through a (steering) tie rod 20. As a positive steering system of this type permits a limited pivot angle only, in this case a coupling (not shown in detail) is provided which may be disengaged, if necessary, in order to regain the full freedom of movement of the swivel wheels (for indoor use of the wheel-chair). For operation of the steering unit, the position of the swivel wheels is monitored or detected by position sensors (not illustrated, either). Engagement of the positive steering system is possible only in a proper relative position of the swivel wheels and steering actuator.

Figure 4:
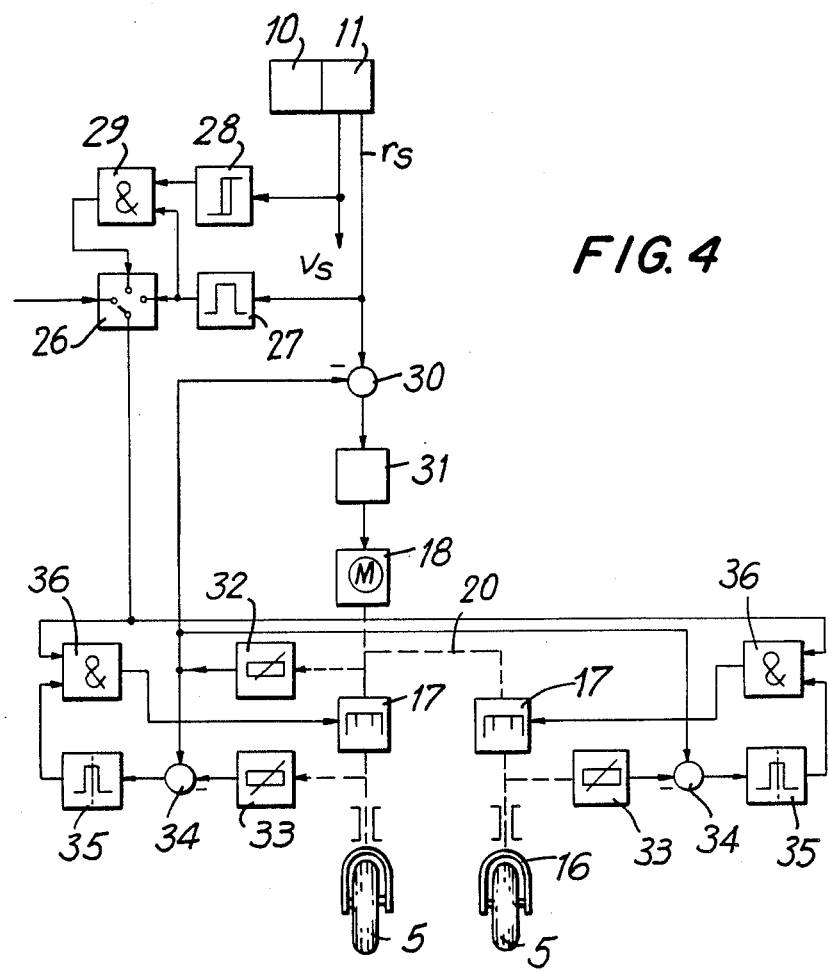
FIG. 4 is a simplified functional diagram of a positive steering system comprising one common steering drive means for both swivel wheels with mechanical turning circle adjusting means.

FIG. 4 illustrates the functional principle of a positive steering system comprising a steering actuator 18 according to FIG. 3. The setting of a turning circle of the swivel wheels is performed through a mechanical steering mechanism, and the pair of swivel wheels are interconnected through a schematically shown tie rod 20.

The direction of travel is selected through the operating unit 10 by means of the control stick 11. Engagement of the positive steering system through couplings 17 may be selected via the switching unit 26. Depending on the position of the switch provided in the switching unit 26, said engagement is performed manually (left hand position) or automatically within a permissible pivoting range, and/or in accordance with the speed of travel of the wheel-chair. In the example shown, the speed $v_s$ set on the operating unit 10 is signalled to the speed threshold unit 28, and the selected direction $r_s$ is signalled to the direction range setting unit 27. These units 27 and 28 generate a signal within a predetermined range of direction or when a given speed of travel is exceeded, respectively, and such signal is supplied to said switching unit 26 either directly or through an AND gate 29. A comparator 30 provides a directional signal for defining a specific turning circle to the positioning (or actuator) element 31 in accordance with the position of the control stick 11. Accordingly, the swivel wheels 5, with the couplings engaged, are turned to the set or selected position through the steering actuator 18.

The angular position is monitored or detected by a position detecting unit. In this instance, the position of the steering actuator is detected by a sensor 32, and the position of the swivel wheels is detected by sensors 33. The swivel wheel angular position detecting sensors 33 may be any conventional design known in the art, such as mechanical, optical or inductive, capacitive or magnetic types of electronic sensors. Comparator units 34 and control units 35 control the relative position between the steering system and the swivel wheels. The output signal from these control units 35 is supplied to an AND gate 36 together with the signal provided by the switching unit 26. When both these signals are applied, the respective couplings 17 are operated, and the swivel wheels 5 are accordingly engaged with the steering actuator 18. Sensor 32 feeds back the position of the steering drive means to the comparator 30, and readjustment is performed by the positioning element 31 and the steering actuator 18 in the case of deviations.

Figure 5:
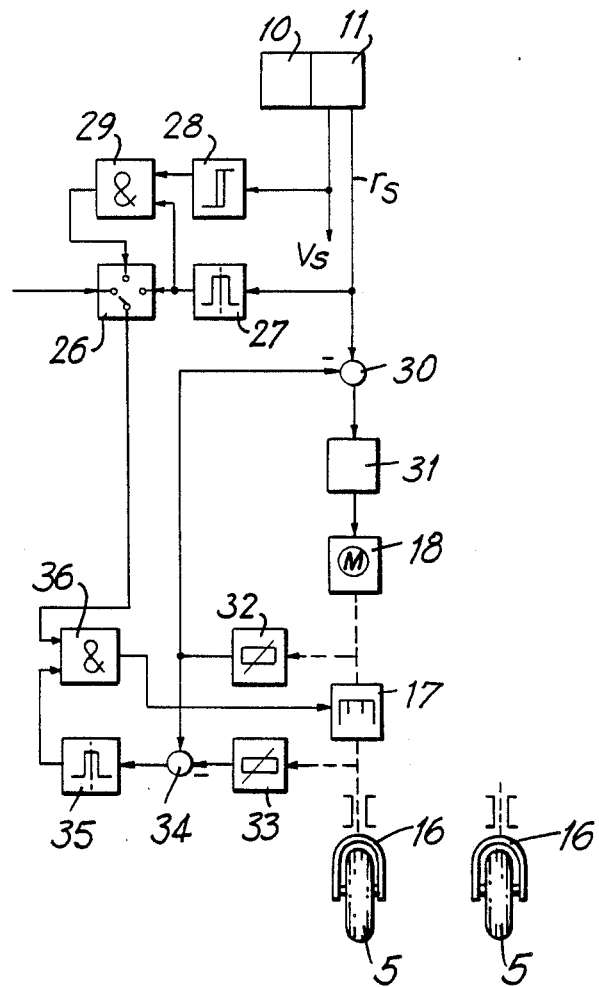
FIG. 5 is a simplified functional diagram of a positive steering system comprising steering drive means for one swivel wheel only.

FIG. 5 illustrates a comparable functional principle of a positive steering system comprising a steering actuator 18 which acts upon one swivel wheel 5 only. In this structure, the second wheel 5 is freely rotatable (turnable) and not used for positive steering purposes. In any other respect, the functional principle is the same as that of FIG. 4, except that the mechanical connection to the second swivel wheel 5 is missing and, accordingly, the coupling 17 and the position detecting unit 32 or 33, respectively, are provided only for the positively steered swivel wheel 5.

Figure 6:
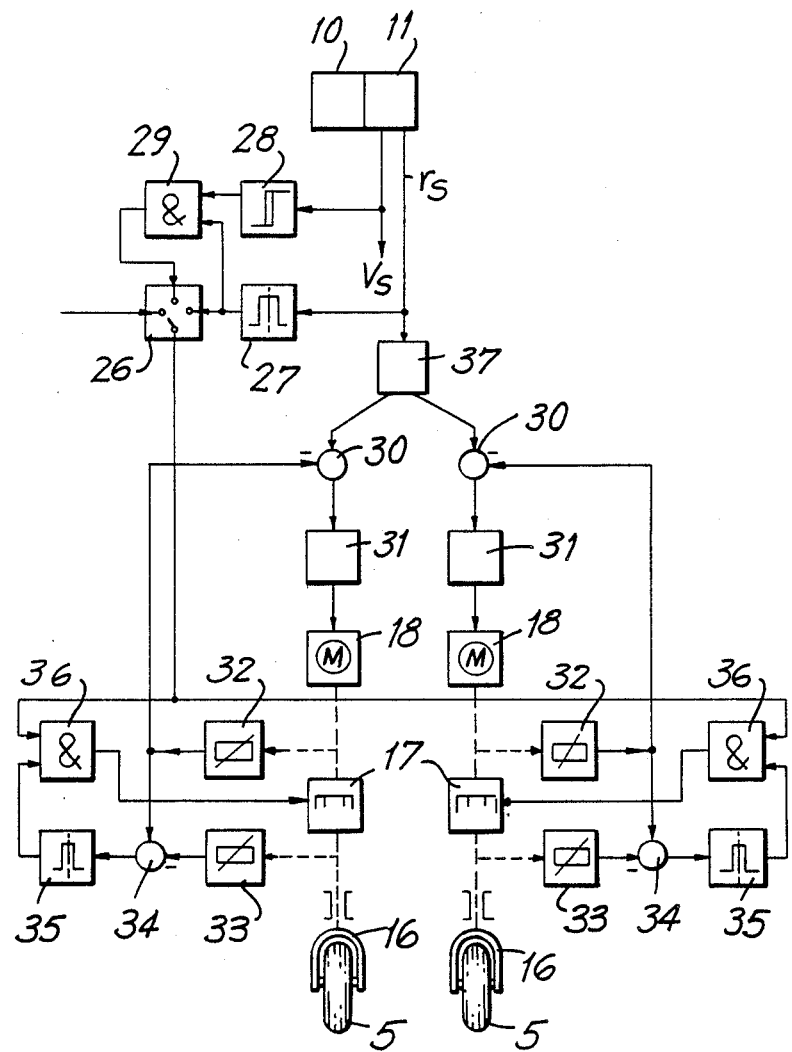
FIG. 6 is a simplified functional diagram of a positive steering system comprising independent steering drive means for each swivel wheel.

A further modification of the same functional principle is illustrated in FIG. 6. This Figure shows a positive steering system comprising an independent steering actuator 18 for each swivel wheel 5. The turning circle of the swivel wheels is selected (or set) via the respective steering actuator 18, with a steering angle computer 37 performing control of both steering drive means. In other respects, the function of the various elements is the same as described in conjunction with FIG. 4. Unlike FIG. 4, this system includes, in addition to a pair of steering actuators 18, also separate positioning elements 31 and comparators 30. Engagement of the positive steering system through couplings 17 takes place in the same manner as in FIG. 4. When the positive steering system is deactivated, both wheels 5 are freely pivotable.

If load-responsive steering actuators 18 are chosen which allow the wheels to pivot freely in a load-free operation, the couplings 17 could be omitted. For example, a low-friction electric steering drive means would allow free pivoting of the steerable (swivel) wheels in a currentless state of operation.

We claim:

1. An electric wheel-chair comprising:
   a chassis;
   a first axle having drive wheels, which is connected to the chassis;
   a pair of second axles which are connected to the chassis, each having a swivel wheel that is pivotable about an axis perpendicular to movement direction of the wheel-chair, so that the swivel wheels change steering radius in response to change in running direction of the wheel-chair;
   an actuator independently coupled to each swivel wheel for steering the wheel in response to steering control signals;
   a seat assembly mounted on the chassis;
   a drive unit coupled to each drive wheel for driving the wheel in response to maneuvering control signals indicative of desired wheel-chair maneuvers to be executed by the drive unit;
   an operating unit coupled to the drive units and the actuators for causing generation of the control signals; and
   means for selectively disengaging coupling of at least one of the swivel wheels from the actuator.

2. The wheel-chair of claim 1, wherein the actuators are positioning motors and wherein the steering control signals are generated by a computer coupled to the positioning motors and the control unit.

3. The wheel-chair of claim 1, wherein the control unit has means for selectively activating drive unit performance of wheel-chair steering maneuvers when steering actuators are coupled to the swivel wheels.

4. The wheel-chair of any one of claim 1-3, wherein the control unit generates maneuvering and steering control signals which coordinate interaction of the actuators and drive units for steering the wheel-chair.

5. The wheel-chair of any one of claims 1-3, wherein the means for selectively disengaging coupling is operable only above a selected swivel wheel pivot angle deviation from a straight line running position.

6. The wheel-chair of any one of claim 1-3, wherein the means for selectively disengaging coupling is a means for mechanical coupling.

7. The wheel-chair of claim 6, wherein the means for mechanical coupling is a friction clutch.

8. The wheel-chair of claim 6, wherein the means for mechanical coupling has positive interlocking engagement between mechanical components.

9. The wheel-chair of any one of claim 1-3, wherein the means for selectively disengaging coupling is an electric motor which steers the swivel wheel in response to steering control signals when the motor is energized and which allows unrestrained rotation of the swivel wheel when the motor is de-energized.

10. The wheel-chair of any one of claims 1-3, further comprising a swivel angular position detector proximal to each swivel wheel that is coupled to the corresponding swivel wheel actuator.

11. The wheel-chair of claim 10, wherein the angular position detector is a mechanical, sensors.

12. The wheel-chair of any one of claims 1-3, wherein the control unit is coupled to a computer which generates the actuator control signals in response to signals generated by the control unit.

13. The wheel-chair of claim 12, further comprising a speed selector coupled to the computer so that the computer monitors selected speed and generates actuator control signals in response to the monitored speed.

14. The wheel-chair of any one of claims 1-3, wherein the means for selectively disengaging coupling of the actuators is manually disengageable.

15. The wheel-chair of claim 1, wherein the actuators are positioning motors, the steering control signals are generated by a computer coupled to the positioning motors and the control unit, and the control unit has means for selectively activating drive unit performance of wheel-chair steering maneuvers when the steering actuators are coupled to the swivel wheels.

16. The wheel-chair of claim 26, wherein the angular position detector is an optical sensor.

17. The wheel-chair of claim 26, wherein the angular position detector is an electronic sensor.

* * * * *